US010272781B2

(12) United States Patent
Olesen et al.

(10) Patent No.: US 10,272,781 B2
(45) Date of Patent: Apr. 30, 2019

(54) TOW BAR CONTROL SYSTEM (71) Applicant: VOLVO CAR CORPORATION, Gothenburg (SE)

(72) Inventors: Anna Olesen, Fredriksberg (DK); Henrik Lohse, Espergaerde (DK)

(73) Assignee: Volvo Car Corporation, Gothenburg (SE)

( * ) Notice: Subject to any disclaimer, the term of this patent is extended or adjusted under 35 U.S.C. 154(b) by 442 days.

(21) Appl. No.: 15/071,367

(22) Filed: Mar. 16, 2016

(65) Prior Publication Data

US 2016/0280023 A1 Sep. 29, 2016

(30) Foreign Application Priority Data

Mar. 25, 2015 (EP) .................................. 15160822

(51) Int. Cl.
*B60K 35/00* (2006.01)
*B60D 1/54* (2006.01)
*B60D 1/62* (2006.01)
*B60Q 9/00* (2006.01)

(52) U.S. Cl.
CPC ............. *B60K 35/00* (2013.01); *B60D 1/54* (2013.01); *B60D 1/62* (2013.01); *B60K 2350/1084* (2013.01); *B60Q 9/002* (2013.01)

(58) Field of Classification Search
None
See application file for complete search history.

(56) References Cited

U.S. PATENT DOCUMENTS

| 6,037,673 | A | * | 3/2000 | Buhler | .................... | B60Q 1/44 |
| | | | | | | 307/10.8 |
| 9,926,008 | B2 | * | 3/2018 | Hafner | .................... | B60D 1/245 |
| 2007/0222183 | A1 | | 9/2007 | Daniel | | |
| 2008/0191449 | A1 | * | 8/2008 | Standen | .................... | B60D 1/36 |
| | | | | | | 280/427 |
| 2010/0230931 | A1 | | 9/2010 | Zelz | | |
| 2011/0216199 | A1 | * | 9/2011 | Trevino | .................... | B60D 1/36 |
| | | | | | | 348/148 |
| 2014/0285330 | A1 | * | 9/2014 | Kouhia | .................... | B66C 13/46 |
| | | | | | | 340/425.5 |
| 2014/0324295 | A1 | * | 10/2014 | Lavoie | .................... | B62D 13/06 |
| | | | | | | 701/41 |
| 2015/0325126 | A1 | * | 11/2015 | Schwindt | ................. | G08G 1/16 |
| | | | | | | 701/36 |

FOREIGN PATENT DOCUMENTS

| DE | 10003607 A1 | 8/2001 |
| DE | 102011118699 A1 | 5/2012 |
| EP | 2746137 A1 | 6/2014 |
| FR | 2916539 A1 | 11/2008 |
| JP | 2009151378 A | 7/2009 |

OTHER PUBLICATIONS

Extended European Search Report dated Sep. 10, 2015, Application No. 15160822.1-1755, Applicant Volvo Car Corporation, 7 Pages.

* cited by examiner

Primary Examiner — Shelley Chen
(74) Attorney, Agent, or Firm — Brooks Kushman P.C.

(57) ABSTRACT

A method performed by a vehicle tow bar control system for controlling position of a movable tow bar of a vehicle during parking is provided, wherein the tow bar is movable between an extended position and a retracted position in relation to the vehicle. The method comprises receiving parking activity input, sensing the position of the tow bar, and transmitting a notification signal for notifying a driver of the vehicle of the position of the tow bar.

16 Claims, 7 Drawing Sheets

TOW BAR CONTROL SYSTEM

CROSS-REFERENCE TO RELATED APPLICATIONS

This application claims foreign priority benefits under 35 U.S.C. § 119(a)-(d) to European patent application number EP 15160822.1, filed Mar. 25, 2015, which is incorporated by reference in its entirety.

TECHNICAL FIELD

The present disclosure relates generally to a vehicle tow bar control system for controlling the position of the tow bar of the vehicle during parking.

BACKGROUND

In prior art document EP2746137 A1 by the applicant, a driving assist system is disclosed, which enables the autonomous parking of a vehicle in a parking place and that uses information about the surroundings such as e.g., other parked vehicles, moving vehicles, dynamic or stationary objects, animals, other barriers or guiding means in a parking area to perform this task. In order to determine information about the surroundings one or more sensors may be utilized, such as a radar, a lidar, an IR camera and/or ultrasonic sensor among others. In this regard, the driving assist system may be referred to as a parking assist system.

In prior art it is known to use tow bars arranged on the vehicle and which length and pivotal position is adjustably controllable from within the vehicle.

A drawback with known tow bars is generally the way they take up unnecessary space when the driver navigates with the vehicle and the tow bar is not used for e.g., towing trailer or supporting a bike carrier. Thus, there is a risk that the tow bar scratches other vehicles during navigation, especially during parking.

SUMMARY

An object of the present disclosure is to facilitate parking with a vehicle having a tow bar. Another object is to increase the availability of accessible parking spaces/spots and reduce the risk of damage to the other vehicles during parking.

According to one embodiment a method is provided performed by a vehicle tow bar control system for controlling the position of the tow bar of the vehicle during parking, the tow bar being movable between an extended position and a retracted position in relation to the vehicle, the method comprising:
  receiving parking activity input,
  sensing the position of the tow bar,
  transmitting a notification signal for notifying the driver of the vehicle of the position of the tow bar.

According to another embodiment, the notification signal is an alarm signal and/or a visual representation on a display and/or any other audial effects/sounds.

According to another embodiment, transmitting a notification signal for notifying the driver of the vehicle (270) is carried out if the tow bar (310) is in an extended position.

According to another embodiment, parking activity input comprises a notification that parking related driving behavior has been initiated, or wherein parking activity input comprises a notification that semi- or full automatic parking assist system has been initiated.

According to another embodiment, the method further comprising:
  requesting parking spot information comprising parking spot length $l_{spot}$,
  receiving parking spot information,
  requesting an available parking space difference (lspot−(lv+ltow) between the parking spot length lspot, and the vehicle, wherein lv, is the length of the vehicle and ltow, is the length of the tow bar extending from the vehicle in the extended position,
  requesting a minimum parking space difference Dmin for carrying out the parking in the parking spot,
  receiving an available parking space difference,
  receiving a minimum parking space difference Dmin for carrying out the parking in the parking spot,
  transmitting a notification signal for notifying the driver of the vehicle of the position of the tow bar if the parking space difference (lspot−(lv+ltow))≤minimum required parking space difference, Dmin≤(lspot−lv), or parking space difference (lspot−(lv+ltow))≤a buffer range above the minimum required parking space difference, x*Dmin.

According to another embodiment, the method further comprising:
  determining an available parking space difference (lspot−(lv+ltow)) between the parking spot length lspot, and the vehicle, wherein lv, is the length of the vehicle and ltow, is the length of the tow bar extending from the vehicle in the extended position,
  determining minimum required parking space difference Dmin for carrying out the parking in the parking spot.

According to another embodiment, the method further comprising:
  receiving a tow bar retracting request,
  requesting a tow bar retraction.

According to another embodiment, the method further comprising:
  automatically requesting a tow bar retraction if the tow bar is in an extended position.

According to another embodiment a vehicle tow bar control system is provided for controlling the position of a tow bar of a vehicle during parking, the tow bar being movable between an extended position and a retracted position in relation to the vehicle, the system is arranged to:
  receive parking activity input from a driver activity system or parking assist system by a vehicle communication unit,
  sense the position of the tow bar by a tow bar sensor,
  transmit a notification signal for notifying the driver of the vehicle of the position of the tow bar.

According to another embodiment, the vehicle tow bar control system is arranged to notify the driver of the vehicle if the tow bar is in an extended position.

According to another embodiment, parking activity input comprises input concerning a notification that parking related driving behavior has been initiated or a notification that semi- or full automatic parking assist system has been initiated.

According to another embodiment, the vehicle tow bar control system is further being arranged to:
  request parking spot information comprising parking spot length lspot, from a parking assist system by a controller,
  receive parking spot information from the parking assist system by a vehicle communication unit,
  request an available parking space difference (lspot−(lv+ltow) between the parking spot length lspot, and the vehicle, wherein lv, is the length of the vehicle and ltow, is the length of the tow bar extending from the vehicle in the extended position by a controller, request a minimum parking space difference Dmin for carrying out the parking in the parking spot, by a controller, receive an available parking space difference, by a vehicle communication unit, receive a minimum parking space difference Dmin for carrying out the parking in the parking spot, by a vehicle communication unit, transmit a notification signal for notifying the driver of the vehicle of the position of the tow bar if the parking space difference (lspot−(lv+ltow))≤minimum required parking space difference, Dmin≤(lspot−lv), or parking space difference (lspot−(lv+ltow))≤a buffer range above the minimum required parking space difference, x*Dmin.

According to another embodiment, a computer program is provided, comprising computer readable code means, which when run in a connected vehicle tow bar control system for controlling the position of a tow bar of a vehicle during parking, causes the connected vehicle tow bar control system for controlling the position of a tow bar of a vehicle during parking to perform the method according to any of the above embodiments.

According to another embodiment, a computer program product is provided, comprising a computer readable medium and a computer program according to the above embodiment, wherein the computer program is stored on the computer readable medium.

According to another embodiment, a vehicle or vessel is provided comprising a vehicle tow bar control system according to any of the previously described embodiments.

BRIEF DESCRIPTION OF THE DRAWINGS

Embodiments according to the disclosure are described below, by way of example, with reference to the accompanying drawings.

DETAILED DESCRIPTION

In the following, a detailed description will be given. In the drawing figures, like reference numerals designate identical or corresponding elements throughout the several figures. It will be appreciated that these figures are for illustration only and do not in any way restrict the scope of the disclosure. Furthermore, the figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
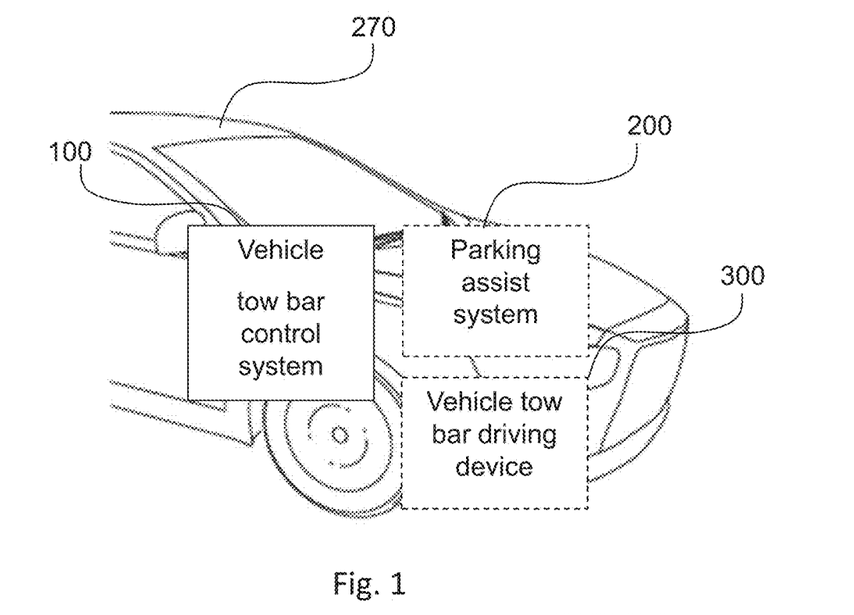
FIG. 1 shows a perspective view of a vehicle comprising a vehicle tow bar control system according to the disclosure.

FIG. 1 shows a perspective view of a vehicle 270 comprising a vehicle tow bar control system 100 for controlling the position of a tow bar 310 of a vehicle 270 during parking. The vehicle tow bar control system 100 may comprise one of e.g., the following: a IHU (Infotainment Head Unit), a TEM (Telematics Module), a CEM (Central Electronic Module) or an ECU (Electronic Control Module). The vehicle 270 further comprises a parking assist system 200 for assisting navigation of the vehicle 270 during parking, such as semi- or full automatic parking navigation, wherein the vehicle tow bar control system 100 may comprise one of e.g., the following: a CEM, ECU, IHU (Integrated Head Unit), DIM (Driver Information Module), a PSCM (Power Steering Control Module). The vehicle 270 further comprises a vehicle tow bar driving device 300. What is referred to as system throughout this patent application may also be known or referred to as a node.

Vehicle tow bars referred to hereinafter may for instance comprise vehicle tow bars comprising tow balls, or tow bars of square tube type as commonly used in e.g., North America, arranged to a rear portion of a vehicle 270 and used for connecting trailers or load carrying devices. In the Figures vehicle tow bars comprising a tow ball will be shown and used as an example.

Figure 2A:
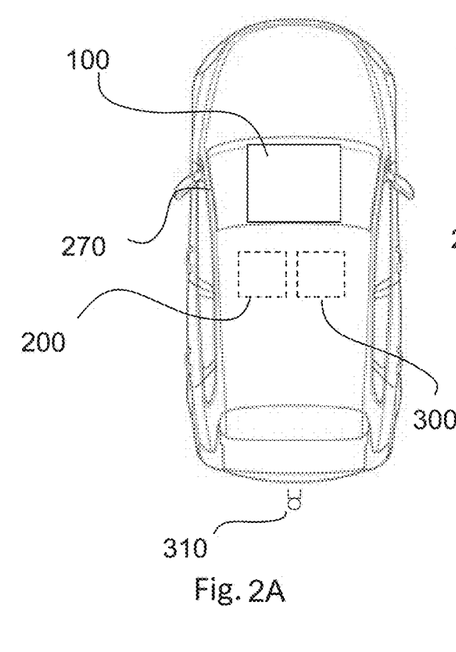
FIG. 2A shows a side view of the vehicle according to FIG. 1, wherein the vehicle tow bar is in an extended position.

FIG. 2A shows a side view of the vehicle according to FIG. 1, comprising the vehicle tow bar control system 100, a parking assist system 200, and vehicle tow bar driving device 300, wherein the vehicle tow bar 310 is in an extended position. In an extended position, the tow bar 310 may be used for connecting trailers or load carrying devices.

Figure 2B:
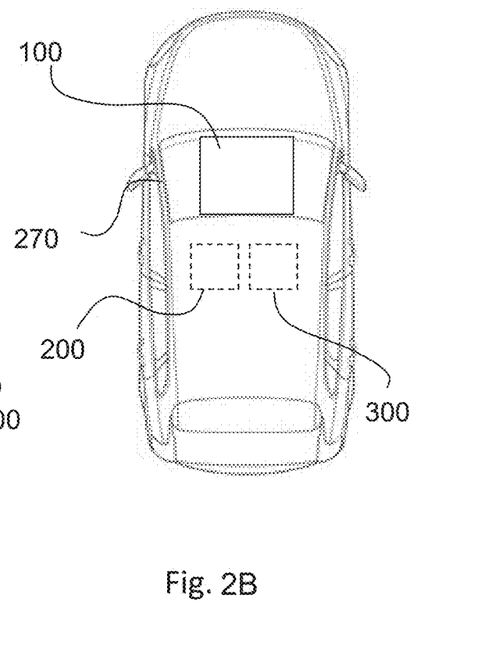
FIG. 2B shows a side view of the vehicle according to FIG. 1, wherein the vehicle tow bar is in a retracted position.

In FIG. 2B, a side view of the vehicle according to FIG. 1 is shown, wherein the vehicle tow bar is in a retracted position. In a retracted position, the tow bar 310 is in a non-use position. In this retracted position, the tow bar 310 does not extend beyond the boundary of the rest of the vehicle 270, i.e., does not extend beyond the rearmost portion of the vehicle in a rearward direction, and therefore the tow bar 310 does not risk scratching other objects/vehicles or causing damage by creating a large pressure force on other objects/vehicles as a result of the vehicle's large mass and the limited area of the end of the tow bar 310.

Figure 3:
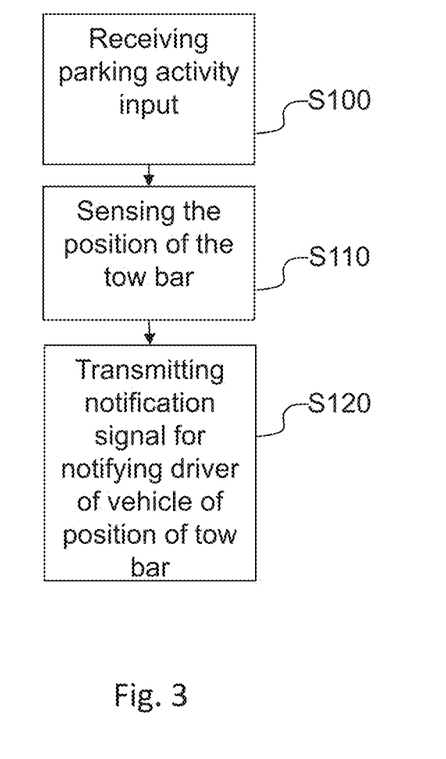
FIG. 3 is a flow chart illustrating a procedure in a vehicle tow bar control system.
Figure 6:
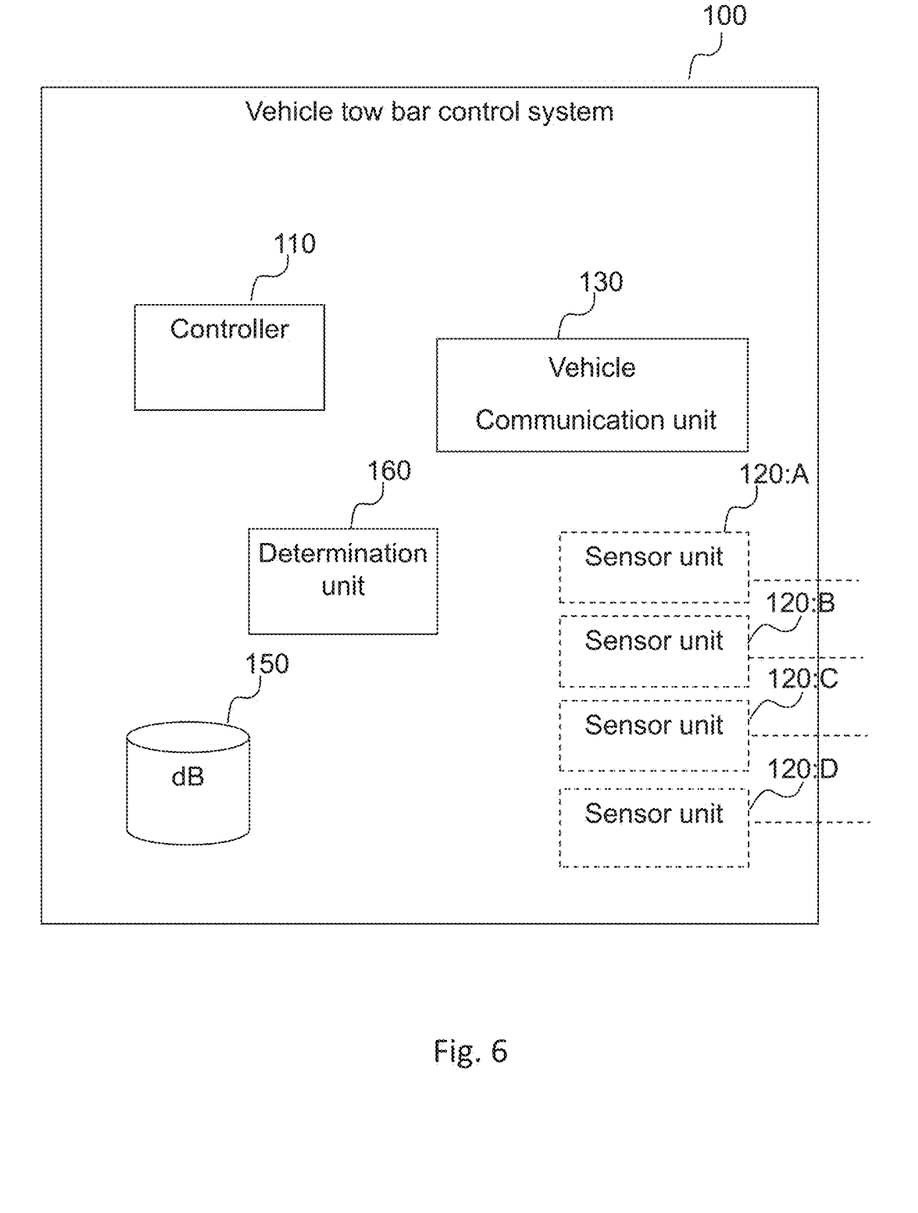
FIG. 6 illustrates example embodiments of a vehicle tow bar control system.

A procedure or method in a vehicle tow bar control system 100 for controlling the position of a tow bar 310 of a vehicle 270 during parking, will now be described with reference to FIG. 3. In a first step S100, the system 100 receives parking activity input. Hereby, the system 100 may be initiated by a recognition of the system 100 that parking activity is initiated, e.g., by sensing certain parking activity related actions carried out by the driver of the vehicle 270, whereby parking activity input is received. Such actions may be stopping the vehicle and/or reversing the vehicle at low speed. According to one embodiment, such actions may further comprises at least one, but alternatively a combination of, stopping the vehicle and/or reversing the vehicle at low speed, driving below a specific speed threshold, scanning for parking spots, approaching a predefined geographical target as set in a GPS device of the vehicle or connected to the vehicle, using flashing indicator. In one embodiment, parking activity input comprises notification that semi- or full automatic parking assist system has been initiated or activated. According to one embodiment, any action that would automatically initiate the semi- or full automatic parking assist system comprises parking activities. In a next step S110, the system 100 senses the position of the vehicle tow bar 310. According to one embodiment, the sensing is carried out by one or a plurality of sensor units 120:A-120:D, as can be seen in FIG. 6. These sensor units 120:A-120:D may be arranged in or in connection with the tow bar 310. According to one embodiment, the sensors 120:A-120:D comprises at least one of a position sensor such as a potentiometer, an inductive type position sensor, or an image capturing device connected to an image processing device for processing the image received by the image capturing device. In a further step S130, the vehicle tow bar control system 100 notifies the driver of the vehicle 270 of the position of the tow bar 310. According to one embodiment, the notification signal is an alarm signal and/or a visual representation on a display and/or any other audial effects/sounds. The notification can be carried out by activating an alert or graphically representing the vehicle tow bar 310, e.g., in relation to a representation of the vehicle 270 on a display in the vehicle 270. According to one embodiment, the graphical/visual representation may be displayed in the CSD (Center Stack Display), the DIM (Driver Information Module) or HUD (Head Up Display). According to one embodiment, the alert is activated via an audial signal. According to one embodiment, the audial signal is a voice communicating information. According to one embodiment, transmitting the notification signal for notifying the driver of the vehicle 270 is carried out if the tow bar 310 is in an extended position. According to one embodiment, the alert or graphical representation will enable the driver to retract the vehicle tow bar 310 before finalizing the parking or select another parking spot which has more space, e.g., is longer in a for-aft direction in relation to the vehicle.

Figure 4:
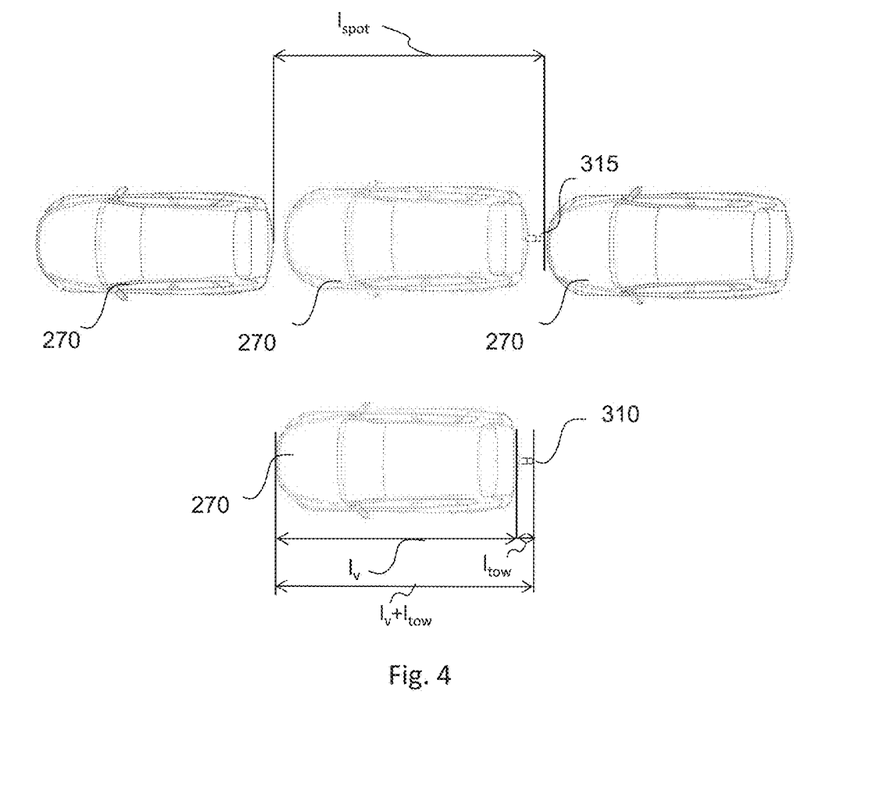
FIG. 4 shows a side view of a vehicle according to FIG. 1, in a parking situation.

FIG. 4 is a side view of a vehicle according to FIG. 1, in a parking situation. A parking spot comprises an area potentially suitable for the vehicle 270 to park. In FIG. 4, such parking spot is shown between vehicles 270' and 270", however the vehicles 270', 270" may be any type of obstacle or boundary defining the parking spot. According to one embodiment, parking spot information comprises information concerning the distance between the vehicles 270', 270" or objects in a length-wise direction, i.e., in a for-aft direction of the vehicle 270 to be parked in a parking spot. The distance is measured from the rearmost position of the vehicle 270' to the front most position of vehicle 270". Such distance is defined as length $l_{spot}$. Parking spot information may comprise additional information such as width, height, obstacles such as glass or sharp objects within the boundary of the parking spot etc. Known parking- or driving assist systems exists. As described in prior art document EP2746137 A1 by the applicant, a driving assist system is disclosed, which enables the autonomous parking of a vehicle in a parking spot and that uses information about the surroundings such as e.g., other parked vehicles, moving vehicles, dynamic or stationary objects, animals, other barriers or guiding means in a parking area to perform this task. In order to determine information about the surroundings one or more sensors may be utilized, such as a radar, a lidar, an IR camera and/or ultrasonic sensor among others. Thus, parking spot information may e.g., be generated and provided by a system described in EP2746137 A1.

FIG. 4 further discloses the vehicle 270 in a first position, shown with a solid line, wherein the system 100 has received parking activity input as the driver and/or the parking assist system identifies a parking spot between vehicles 270' and 270". The tow bar 310 is in an extended position. The length of the vehicle 270 is defined $l_v$. The length of the tow bar that extends beyond the boundary of the rearmost portion of the vehicle 270 is defined as $l_{tow}$. FIG. 4 also discloses the vehicle 270 in a future position, shown by a dashed line, when parked in the parking spot between the vehicles 270' and 270".

Figure 5A:
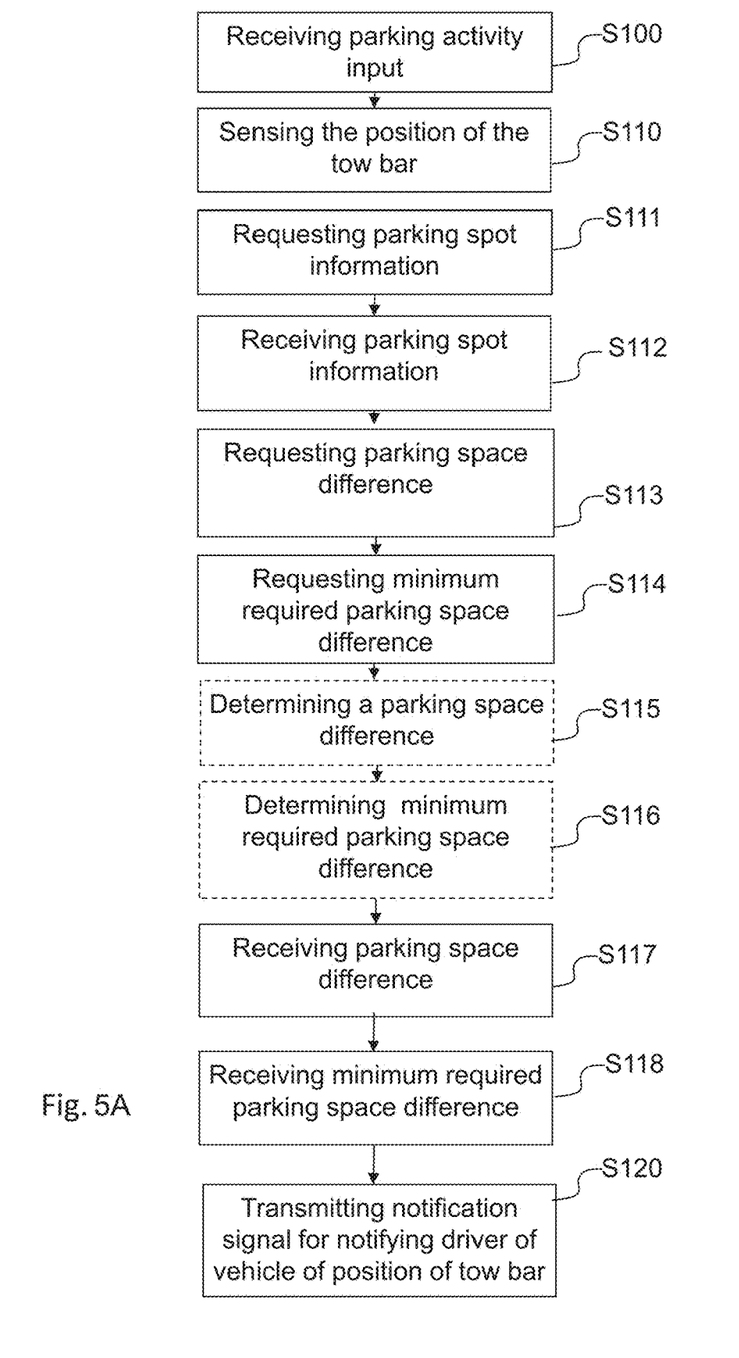
FIG. 5A is a flow chart illustrating a procedure in a vehicle tow bar control system.

FIG. 5A is a flow chart illustrating a procedure in a vehicle tow bar control system according to one embodiment. The procedure comprises the steps S100, S110, and a similar step S120 as described above for FIG. 3, and further comprises steps S111, S112, S113, S114, S117, S118. After steps S100, S110, the procedure in the vehicle tow bar control system 100, comprises step S111 whereby it requests parking spot information from a parking assist system 200, comprising parking spot length $l_{spot}$, and receives parking spot information in a next step S112. In a further step S113, the system 100 requests an available parking space difference ($l_{spot}-(l_v+l_{tow})$). The request may be sent to the parking assist system 200, or within the vehicle tow bar control system 100. According to one embodiment, the length of the vehicle $l_v$ is not variable but a given length pre-stored in the parking assist system 200 or tow bar control system 100. In a next step S114, the system 100 requests a minimum required parking space difference $D_{min}$. The minimum required parking space difference $D_{min}$ is the minimum space required for carrying out a parking procedure without risking to cause damage to the vehicle 20 or surrounding vehicles or objects. According to one embodiment, the minimum required parking space difference $D_{min}$ is a pre-defined and pre-stored default value, e.g., stored in a database 150. According to one embodiment, the minimum required parking space difference $D_{min}$ is selected by the driver. According to one embodiment, the minimum required parking space difference $D_{min}$ is based on the input data related to the driving behavior of the driver or driver identification data. This enables a more dynamic system which may increase the number of available parking spots for more experienced drivers. The request may be sent to the parking assist system 200, or within the vehicle tow bar control system 100. In step S115 a parking space difference ($l_{spot}-(l_v+l_{tow})$) is determined either by the parking assist system 200 or the vehicle tow bar control system 100. In a step S116, the minimum required parking space difference $D_{min}$ is determined either by the parking assist system 200 or the vehicle tow bar control system 100. In step S117 the vehicle tow bar control system 100 receives the parking space difference, and in step S118, the vehicle tow bar control system 100 receives the minimum required parking space difference $D_{min}$. In step S120, the driver of the vehicle 270 is notified of the position of the tow bar, under certain conditions, i.e., a notification signal is transmitted for notifying the driver of the vehicle 270 of the position of the tow bar 310 if the parking space difference ($l_{spot}-(l_v+l_{tow})$) is less or equal than a minimum required parking space difference $D_{min}$, i.e., if $(l_{spot}-(l_v+l_{tow})) \leq D_{min}$, and wherein further the retracted tow bar would enable the parking of the vehicle 270 in the parking spot, i.e., if $(l_{spot}-l_v) \leq D_{min}$. Alternatively, a notification signal is transmitted for notifying the driver of the vehicle 270 of the position of the tow bar 310 if the parking space difference ($l_{spot}-(l_v+l_{tow})$) is less than a buffer range x above the minimum required parking space difference i.e., $(l_{spot}-(l_v+l_{tow})) \leq x*D_{min}$. According to one embodiment, the buffer range x is defined as a percentage of $D_{min}$ e.g., $0 \leq x \leq 1.5$. According to one embodiment, $0 \leq x \leq 1.25$. According to one embodiment, $0 \leq x \leq 1.10$. According to one embodiment, 0≤x≤1.05. According to one embodiment, a notification signal is transmitted if the tow bar 310 is in an extended position.

Figure 5B:
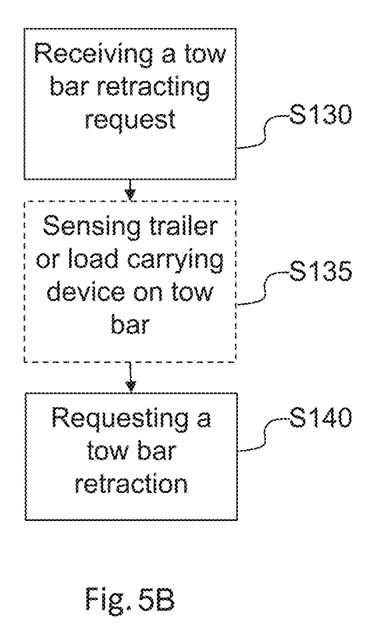
FIG. 5B is a flow chart illustrating a procedure in a vehicle tow bar control system.
Figure 5C:
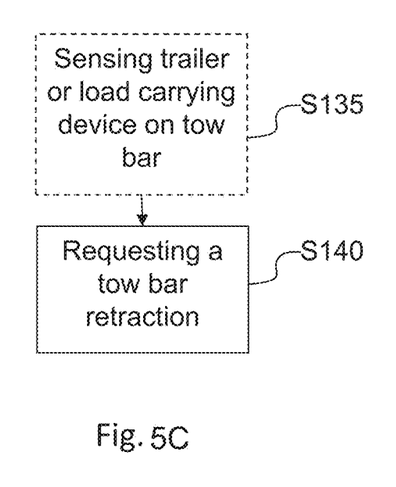
FIG. 5C is a flow chart illustrating a procedure in a vehicle tow bar control system.

According to one embodiment, when the driver has been notified, the driver may decide to actively request a retraction of the tow bar 310 in order to enable a parking in a specific parking spot. Therefore, as described in FIG. 5B, in a next step S130, the vehicle tow bar control system 100 receives a tow bar 310 retracting request. In a further step S140, system 100 requests a tow bar 310 retraction for retracting the tow bar 310. The request may be sent to a vehicle tow bar driving device as shown in FIG. 1, FIG. 2A, FIG. 2B, which comprises means, such as a motor, for driving the tow bar 310 between an extended and a retracted position. In an intermediate step S135, a sensor unit 120:B e.g., arranged on the tow bar 310 senses if a trailer or any kind of load carrying device is arranged on the tow bar 310 before requesting the retraction of the tow bar 310. If the sensor unit 120:B, senses that a trailer or any kind of load carrying device such as e.g., a bike carrier, is arranged on the tow bar 310, the driver is notified that retraction of the tow bar 310 is not possible by transmitting a notification signal. According to one alternative embodiment, as described in FIG. 5C, the method directly and automatically performs the step S140, wherein the system 100 automatically requests a tow bar 310 retraction if the tow bar 310 is in an extended position. As described above, in an intermediate step S135, a sensor unit 120:B e.g., arranged on the tow bar 310 senses if a trailer or any kind of load carrying device is arranged on the tow bar 310 before requesting the retraction of the tow bar 310. If the sensor unit 120:B, senses that a trailer or any kind of load carrying device is arranged on the tow bar 310, the driver is notified that retraction of the tow bar 310 is not possible by transmitting a notification signal.

FIG. 6 discloses a vehicle tow bar control system 100 for controlling the position of a tow bar 310 of a vehicle 270 during parking, the tow bar 310 being movable between an extended position and a retracted position in relation to the vehicle 270. The system 100 is arranged to receive parking activity input from a driver activity system or parking assist system 200 by a vehicle communication unit 130. The system 100 is further arranged to sense the position of a tow bar 310 of the vehicle 270 by a tow bar sensor 120:A. The system is arranged to transmit a notification signal for notifying the driver of the vehicle 270 of the position of the tow bar 310. The notification signal may be an alarm signal and/or a visual representation on a display and/or any other audial effects/sounds. According to one embodiment, the vehicle tow bar control system 100 is arranged to notify the driver of the vehicle 270 if the tow bar is in an extended position. According to one embodiment, parking activity input comprises input concerning a notification that parking related driving behavior has been initiated or a notification that semi- or full automatic parking assist system has been initiated. According to one embodiment, the system may further be arranged to request parking spot information from a parking assist system 300 by a controller 110. The system may be arranged to receive parking spot information comprising parking spot length $l_{spot}$ from a parking assist system 300 by a vehicle communication unit 130. The system 100 may further be arranged to request parking space difference $(l_{spot}-(l_v+l_{tow}))$ by a controller 110 from e.g., a parking assist system 300 or the vehicle tow bar control system 100, wherein $l_v$ is the length of the vehicle 270 and $l_{tow}$ is the length of the extended tow bar 310 as described above for the procedure of the system 100. The system 100 may further be arranged to request a minimum required parking space difference $D_{min}$ by a controller 110, $D_{min}$ being the minimum space required for carrying out a parking procedure without risking to cause damage to the vehicle 20 or surrounding vehicles or objects as described above for the procedure of the system 100. The request may e.g., be sent to the parking assist system 200 or the vehicle tow bar control system 100. The system 100 or the parking assist system 200 may be arranged to determine a parking space difference $(l_{spot}-(l_v+l_{tow}))$, especially by a determination unit 160. The system 100 or the parking assist system 200 may further be arranged to determine the minimum required parking space difference $D_{min}$, by a determination unit 160. The system 100 is further arranged to receive the parking space difference $(l_{spot}-(l_v+l_{tow}))$ as well as the minimum required parking space difference $D_{min}$ from either the system 100 or the parking assist system 200 by a vehicle communication unit 130. Further, the system 100 is arranged to transmit a notification signal for notifying the driver of the vehicle 270 of the position of the tow bar 310 if the parking space difference $(l_{spot}-(l_v+l_{tow}))$ is less or equal than the minimum required parking space difference a minimum required parking space difference $D_{min}$, i.e., if $(l_{spot}-(l_v+l_{tow}))\leq D_{min}$, and wherein further the retracted tow bar would enable the parking of the vehicle 270 in the parking spot, i.e., if $(l_{spot}-(l_v+l_{tow}))\geq D_{min}$. Alternatively, the system is arranged to transmit a notification signal for notifying the driver of the vehicle 270 of the position of the tow bar 310 if the parking space difference $(l_{spot}-(l_v+l_{tow}))$ is less than a buffer range x above the minimum required parking space difference i.e., $(l_{spot}-(l_v+l_{tow}))\leq x*D_{min}$. According to one embodiment, the buffer range x is defines as a percentage of $D_{min}$ e.g., 0≤x≤1.5. According to one embodiment, 0≤x≤1.25. According to one embodiment, 0≤x≤1.10. According to one embodiment, 0≤x≤1.05. According to one embodiment, a notification signal is transmitted if the tow bar 310 is in an extended position. According to one embodiment, the vehicle tow bar control system 100 is arranged to receive a tow bar 310 retracting request by a vehicle communication unit 130. The system 100 is further arranged to request a tow bar 310 retraction for retracting the tow bar 310 by a controller 110, wherein the request may be sent to a vehicle tow bar driving device 300. This request may be automatically sent. According to one embodiment, the system 100 is further arranged to sense if a trailer or any kind of load carrying device is arranged on the tow bar 310 by a sensor unit 120:A-120:D. According to one embodiment, if the sensor unit 120:B, senses that a trailer or any kind of load carrying device is arranged on the tow bar 310, the system 100 is arranged to notify the driver that a retraction of the tow bar 310 is not possible, by transmitting a notification signal.

Figure 7:
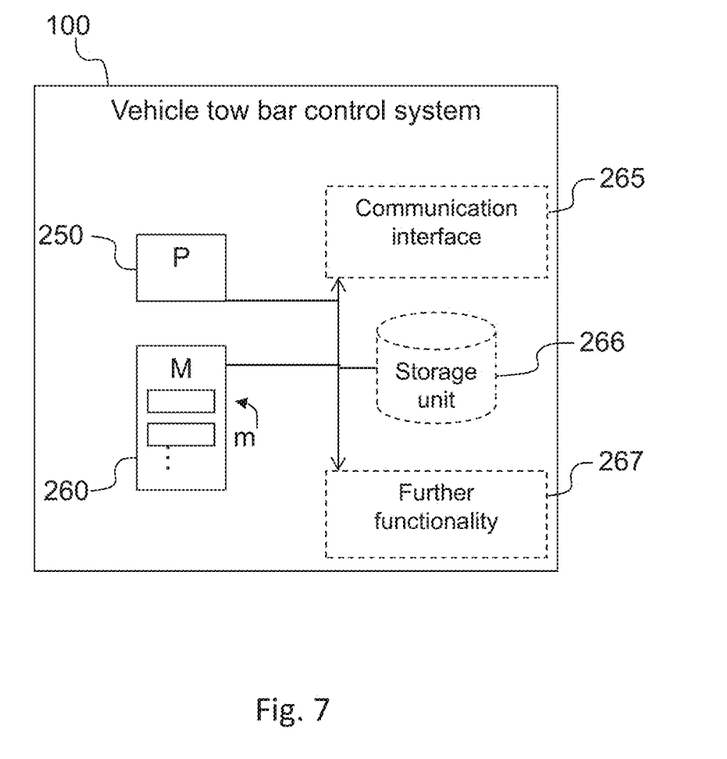
FIG. 7 shows an illustration of embodiments of a vehicle tow bar control system.

FIG. 7 shows an illustration of embodiments of a vehicle tow bar control system 100. The vehicle tow bar control system 100 may be implemented, by means of program modules of a respective computer program comprising code means which, when run by a processing unit 250 causes the vehicle tow bar control system to perform the above-described actions. The processing unit 250 may comprise a single Central Processing Unit (CPU), or could comprise two or more processing units. For example, the processing unit 250 may include general purpose microprocessors, instruction set processors and/or related chips sets and/or special purpose microprocessors such as Application Specific Integrated Circuits (ASICs). The processing unit 250 may also comprise a storage for caching purposes.

Each computer program may be carried by a computer program product 260 in the vehicle tow bar control system 100, shown in FIGS. 1, 2, 6, 7 et al, in the form of a memory having a computer readable medium and being connected to the processing unit 250. The computer program product 260 or memory thus comprises a computer readable medium on which the computer program is stored e.g., in the form of computer program modules "m". For example, the memory 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the vehicle tow bar control system 100.

The vehicle tow bar control system 100 may further comprise a communication interface 265. The communication interface 265 may be arranged to communicate with for example the sensor unit 120, parking assist system 200, vehicle tow bar driving device 300. In an embodiment the communication interface 265 may comprise chip set adopted for communication via CAN bus (Controller Area Network) or communication adopted to ISO 11898. Other examples of standards which may be supported by the communication interface 265 are: ZigBee, Bluetooth, RFID (Radio frequency identification), USB (Universal serial bus), or IEEE 802.11(Institute of Electrical and Electronics Engineers), including but not limited to 802.11a/b/n or other similar forthcoming standards. The communication interface 265 may comprise an antenna. The communication interface 265 may be connectable to an external antenna. The vehicle tow bar control system 100 may further comprise one or more storage units 266 and further functionality 267 useful for the vehicle tow bar control system 100 to serve its purpose as vehicle tow bar control system, such as power supply, internal communications bus, internal cooling, database engine, operating system, not limiting to other functionalities.

Embodiments of a vehicle tow bar control system according to the disclosure have been described. However, the person skilled in the art realizes that these can be varied within the scope of the appended claims without departing from the inventive idea.

All the described alternative embodiments above or parts of an embodiment can be freely combined without departing from the inventive idea as long as the combination is not contradictory.

What is claimed is:

1. A method performed by a vehicle tow bar control system for controlling a position of a tow bar of a vehicle during parking, the tow bar being movable between an extended position and a retracted position in relation to the vehicle, the method comprising:
   receiving parking activity input;
   after receipt of parking activity input, sensing a position of the tow bar during parking; and
   transmitting a notification signal for notifying a driver of the vehicle during parking of the sensed position of the tow bar.

2. The method according to claim 1 wherein the notification signal comprises an alarm signal and/or a visual representation on a display and/or any other audial effects/sounds.

3. The method according to claim 1 wherein transmitting the notification signal for notifying the driver of the vehicle is carried out if the tow bar is in the extended position.

4. The method according to claim 1 wherein parking activity input comprises a notification that parking related driving behaviour has been initiated, or a notification that a semi- or full automatic parking assist system has been initiated.

5. The method according to claim 1 further comprising:
   requesting parking spot information comprising parking spot length $l_{spot}$ for a parking spot;
   receiving parking spot information;
   requesting an available parking space difference $(l_{spot}-(l_v+l_{tow}))$ between the parking spot length $l_{spot}$, and the vehicle, wherein $l_v$ is the length of the vehicle and $l_{tow}$ is the length of the tow bar extending from the vehicle in the extended position;
   requesting a minimum parking space difference $D_{min}$ for carrying out parking in the parking spot;
   receiving an available parking space difference;
   receiving a minimum parking space difference $D_{min}$ for carrying out the parking in the parking spot;
   transmitting a notification signal for notifying the driver of the vehicle of the position of the tow bar if the parking space difference $(l_{spot}-(l_v+l_{tow}))\leq$minimum required parking space difference, $D_{min}\leq(l_{spot}-l_v)$, or parking space difference $(l_{spot}-(l_v+l_{tow}))\leq$a buffer range above the minimum required parking space difference, $x*D_{min}$.

6. The method according to claim 5 further comprising:
   determining an available parking space difference $(l_{spot}-(l_v+l_{tow}))$ between the parking spot length $l_{spot}$ and the vehicle, wherein $l_v$ is the length of the vehicle and $l_{tow}$ is the length of the tow bar extending from the vehicle in the extended position;
   determining minimum required parking space difference $D_{min}$ for carrying out the parking in the parking spot.

7. The method according to claim 1 further comprising:
   determining an available parking space difference $(l_{spot}-(l_v+l_{tow}))$ between a parking spot length $l_{spot}$ of a parking spot and the vehicle, wherein $l_v$ is a length of the vehicle and $l_{tow}$ is a length of the tow bar extending from the vehicle in the extended position,
   determining a minimum required parking space difference $D_{min}$ for carrying out parking in the parking spot.

8. The method according to claim 1 further comprising:
   receiving a tow bar retracting request; and
   requesting a tow bar retraction.

9. The method according to claim 3 further comprising:
   automatically requesting a tow bar retraction if the tow bar is in the extended position.

10. A vehicle tow bar control system for controlling a position of a tow bar of a vehicle during parking, the tow bar being movable between an extended position and a retracted position in relation to the vehicle, the vehicle tow bar control system comprising:
    a vehicle communication unit to receive parking activity input from a driver activity system or parking assist system;
    a tow bar senor for sensing a position of the tow bar during parking after receipt by the vehicle communication unit of parking activity input;
    wherein the vehicle tow bar control system is operable to transmit a notification signal for notifying a driver of the vehicle during parking of the sensed position of the tow bar.

11. The vehicle tow bar control system according to claim 10 wherein the vehicle tow bar control system is operable to notify the driver of the vehicle if the tow bar is in an extended position.

12. The vehicle tow bar control system according to claim 10 wherein parking activity input comprises input concerning a notification that parking related driving behaviour has been initiated or a notification that a semi- or full automatic parking assist system has been initiated.

13. The vehicle tow bar control system according to claim 10 further comprising a controller for requesting parking spot information comprising parking spot length $l_{spot}$ of a parking spot from a parking assist system, wherein the vehicle tow bar control system is further operable to:
- receive, by the vehicle communication unit, parking spot information from the parking assist system;
- request, by the controller, an available parking space difference $(l_{spot}-(l_v+l_{tow}))$ between the parking spot length $l_{spot}$, and the vehicle, wherein $l_v$ is a length of the vehicle and $l_{tow}$ is a length of the tow bar extending from the vehicle in the extended position;
- request, by the controller, a minimum parking space difference $D_{min}$ for carrying out parking in the parking spot;
- receive an available parking space difference by the vehicle communication unit;
- receive, by the vehicle communication unit, the minimum parking space difference $D_{min}$ for carrying out the parking in the parking spot; and
- transmit a notification signal for notifying the driver of the vehicle of the position of the tow bar if the parking space difference $(l_{spot}-(l_v+l_{tow}))\le$minimum required parking space difference, $D_{min}\le(l_{spot}-l_v)$, or parking space difference $(l_{spot}-(l_v+l_{tow}))\le$a buffer range above the minimum required parking space difference, $x*D_{min}$.

14. The vehicle tow bar control system according to claim 10 wherein the vehicle tow bar control system is further operable to:
- receive, by the vehicle communication unit, an available parking space difference $(l_{spot}-(l_v+l_{tow}))$ between a parking spot length $l_{spot}$ of a parking spot and the vehicle, wherein $l_v$ is a length of the vehicle and $l_{tow}$ is a length of the tow bar extending from the vehicle in the extended position;
- receive, by the vehicle communication unit, a minimum parking space difference $D_{min}$ for carrying out parking in the parking spot; and
- transmit a notification signal for notifying the driver of the vehicle of the position of the tow bar if the parking space difference $(l_{spot}-(l_v+l_{tow}))\le$minimum required parking space difference, $D_{min}\le(l_{spot}-l_v)$, or parking space difference $(l_{spot}-(l_v+l_{tow}))\le$a buffer range above the minimum required parking space difference, $x*D_{min}$.

15. A vehicle comprising the vehicle tow bar control system according to claim 10.

16. A non-transitory storage medium having stored computer executable code, which, when executed in a connected vehicle tow bar control system arranged for controlling a position of a tow bar of a vehicle during parking, causes the vehicle tow bar control system to:
- receive parking activity input;
- after receipt of parking activity input, sense a position of the tow bar during parking; and
- transmit a notification signal for notifying a driver of the vehicle during parking of the sensed position of the tow bar.

* * * * *

UNITED STATES PATENT AND TRADEMARK OFFICE
CERTIFICATE OF CORRECTION

PATENT NO. : 10,272,781 B2
APPLICATION NO. : 15/071367
DATED : April 30, 2019
INVENTOR(S) : Anna Olesen et al.

It is certified that error appears in the above-identified patent and that said Letters Patent is hereby corrected as shown below:

In the Claims

Column 10, Line 55, Claim 10:
After "a tow bar"
Delete "senor" and
Insert -- sensor --.

Signed and Sealed this
Fifteenth Day of October, 2019

Andrei Iancu
*Director of the United States Patent and Trademark Office*